(12) United States Patent
Sadashima et al.

(10) Patent No.: US 6,689,849 B1
(45) Date of Patent: Feb. 10, 2004

(54) CATALYST FOR BULK POLYMERIZATION, CATALYST FOR VAPOR PHASE POLYMERIZATION, METHOD OF POLYMERIZATION USING THESE, AND OLEFIN POLYMER OBTAINED WITH THESE

(75) Inventors: Takanori Sadashima, Ichihara (JP); Masami Kanamaru, Ichihara (JP); Tsuyoshi Ota, Ichihara (JP); Hideo Funabashi, Ichihara (JP)

(73) Assignee: Idemitsu Petrochemical Co., Ltd. (JP)

( * ) Notice: Subject to any disclaimer, the term of this patent is extended or adjusted under 35 U.S.C. 154(b) by 0 days.

(21) Appl. No.: 10/018,478

(22) PCT Filed: May 19, 2000

(86) PCT No.: PCT/JP00/03234

§ 371 (c)(1),
(2), (4) Date: Dec. 19, 2001

(87) PCT Pub. No.: WO01/81433

PCT Pub. Date: Nov. 1, 2001

(30) Foreign Application Priority Data

Apr. 24, 2000 (JP) .......................................... 2000-123216
Apr. 24, 2000 (JP) .......................................... 2000-123217

(51) Int. Cl.$^7$ ................................................. C08F 4/42
(52) U.S. Cl. ................... 526/142; 526/125.3; 526/128; 526/348; 526/124.3; 526/901; 526/902; 502/103; 502/118; 502/158
(58) Field of Search ................. 526/125.3, 128, 526/348, 124.3, 901, 902, 142; 502/103, 118, 158

(56) References Cited

U.S. PATENT DOCUMENTS 4,958,041 A * 9/1990 Graefe et al. ............... 556/480
5,194,531 A * 3/1993 Toda et al. .................. 526/125

FOREIGN PATENT DOCUMENTS

| EP | 0 319 913 | 6/1989 |
| EP | 0 376 084 | 7/1990 |
| EP | 0 376 084 A2 * | 7/1990 |
| JP | 2-163104 | 6/1990 |
| JP | 4-227707 | 8/1992 |
| JP | 4-359904 | 12/1992 |
| JP | 8-59730 | 3/1996 |
| WO | WO 95/22568 | 8/1995 |

* cited by examiner

Primary Examiner—Ling-Siu Choi
(74) Attorney, Agent, or Firm—Parkhurst & Wendel, L.L.P.

(57) ABSTRACT

The present invention provides a catalyst for bulk or vapor-phase polymerization having high polymerization activity during bulk or vapor-phase polymerization and providing an olefin polymer having excellent properties in melt flow rate and stereoregularity by adding a small amount of hydrogen.

The catalyst for bulk or vapor-phase polymerization of an α-olefin compound under a presence of hydrogen, the catalyst is made by contacting the following ingredients (A) to (C).

(A) a solid catalyst ingredient, comprising:
  (a) a magnesium compound,
  (b) titanium tetrachloride, and
  (c) dialkyl phthalate (Each of the alkyl group denotes a straight-chain or branched-chain hydrocarbon group having a carbon number of 3 to 20.);
(B) an organoaluminum compound; and
(C) an organosilicon compound, which is expressed by the following general chemical formula (1).

$$(R^1)(R^2CH_2)Si(OR^3)(OR^4) \tag{1}$$

16 Claims, 2 Drawing Sheets

CATALYST FOR BULK POLYMERIZATION, CATALYST FOR VAPOR PHASE POLYMERIZATION, METHOD OF POLYMERIZATION USING THESE, AND OLEFIN POLYMER OBTAINED WITH THESE

TECHNICAL FIELD

The present invention relates to catalysts for bulk polymerization and vapor-phase polymerization of an α-olefin compound, methods for polymerizing an α-olefin compound by using the catalysts, and olefin polymers obtained by using the catalysts.

To say in detail, the present invention relates to catalysts for bulk polymerization and vapor-phase polymerization, each of the catalysts has high polymerization activity during bulk or vapor-phase polymerization of an α-olefin compound as a raw material monomer, and each of the catalysts provides an olefin polymer having excellent properties in melt flow rate and stereoregularity by adding a small amount of hydrogen; methods for polymerizing an α-olefin compound by using the catalysts; and olefin polymers obtained by using the catalysts.

BACKGROUND ART

Up to now, as a catalyst for polymerizing an α-olefin compound and fabricating an olefin polymer, Ziegler type catalyst is well known. Examples of these catalysts are disclosed in Japanese publication of unexamined patent application No. Hei-2-163104 and Japanese publication of unexamined international patent application No. Hei-8-509263.

To give an actual example, the catalyst, disclosed in Japanese publication of unexamined patent application No. Hei-2-163104, comprises the following ingredients (A1) to (C1).

(A1) a solid catalyst ingredient including trivalent titanium, the ingredient is obtained by the following steps;
reducing halogenated titanium by an organomagnesium compound under a presence of an organosilicon compound having a Si—O bonding to thereby form a solid product,
treating the solid product with an ester compound, and then
treating the solid compound with a mixture of an ether compound, titanium tetrachloride, and an ester compound;
(B1) an organoaluminum compound; and
(C1) dialkyldialkoxysilane and the like.

The catalyst, disclosed in Japanese publication of unexamined international patent application No. Hei-8-509263, comprises the following ingredients (A2) to (C2).

(A2) a solid compound including magnesium atoms, halogen atoms, and transition metal atoms such as titanium;
(B2) an organoaluminum derivative; and
(C2) dialkyldialkoxysilane and the like.

By the way, in general, when an α-olefin compound is bulk polymerized or vapor-phase polymerized, a melt flow rate (MFR) is heighten by using a chain transfer agent, such as hydrogen, and thereby lower a molecular weight of an olefin polymer.

However, the catalysts, disclosed in Japanese publication of unexamined patent application No. Hei-2-163104 and Japanese publication of unexamined international patent application No. Hei-8-509263, have the following problems.

(1) Although an olefin polymer having an excellent stereoregularity is obtained by bulk polymerization or vapor-phase polymerization, a melt flow rate against the hydrogen using amount is small. As a result, the catalyst is unfavorable for fabricating an olefin polymer having a high melt flow rate.

To give an actual example, referring to FIG. 1, when hydrogen partial pressure during bulk polymerization is 0.25 MPa (gauge), MFR (in accordance with JIS-K7210) of the obtained olefin polymer is about 1.2 g/10 min. Whereas, when hydrogen partial pressure is increased to 1 MPa (gauge), MFR of the obtained olefin polymer is about 14 g/10 min Further, referring to FIG. 2, when hydrogen partial pressure during vapor-phase polymerization is 0.01 MPa (gauge), MFR (in accordance with JIS-K7210) of the obtained olefin polymer is about 0.03 g/10 min. Whereas, when hydrogen partial pressure is increased to 0.09 MPa (gauge), MFR of the obtained olefin polymer is about 2.5 g/10 min That is to say, with respect to the conventional catalyst, a large quantity of hydrogen should be used in order to lower the melt flow rate of the olefin polymer.

(2) When an olefin polymer having a high melt flow rate is fabricated by bulk polymerization or vapor-phase polymerization by using the above catalyst, the stereoregularity of the obtained olefin polymer is deteriorated.

That is to say, since the stereoregularity and the melt flow rate of the olefin polymer are conflict properties in general, in order to fabricate an olefin polymer having a high melt flow rate, the stereoregularity is deteriorated. As a result, heat resistance and creep resistance of the olefin polymer are deteriorated.

(3) When an olefin polymer having a high melt flow rate is fabricated by bulk polymerization or vapor-phase polymerization by using the above catalyst, much more hydrogen is needed. As a result, in view of safety, high pressure resistance of the manufacturing equipment should be needed.

(4) Further, with respect to the catalyst, when a large quantity of hydrogen is used, hydrogen partial pressure during bulk polymerization or vapor-phase polymerization is heightened and thereby partial pressure of the monomer is lowered. As a result, productivity of the olefin polymer is deteriorated.

Under the circumstances, catalysts, having high polymerization activity during bulk polymerization or vapor-phase polymerization, and providing an olefin polymer having desired molecular weight and melt flow rate by adding a small amount of hydrogen, is needed.

Therefore, the present invention is acquired in view of the above problems. The object in accordance with the present invention is to provide a catalyst for bulk polymerization or vapor-phase polymerization, the catalyst having high polymerization activity during bulk polymerization or vapor-phase polymerization and providing an olefin polymer having excellent properties in melt flow rate and stereoregularity by adding a small amount of hydrogen by combining a specific solid catalyst, an organoaluminum compound and a specific organosilicon compound.

In addition, the object in accordance with the present invention is to provide methods for bulk polymerization and vapor-phase polymerization, the methods effectively provide an olefin polymer having excellent properties in melt flow rate and stereoregularity by using the catalysts for bulk polymerization and vapor-phase polymerization.

In addition, the object in accordance with the present invention is to provide an olefin polymer, having excellent properties in melt flow rate and stereoregularity, obtained by using the catalysts for bulk polymerization and vapor-phase polymerization.

DISCLOSURE OF THE INVENTION

[1] One embodiment in accordance with the present invention (First invention) is a catalyst for bulk polymerization of an α-olefin compound under a presence of hydrogen, the catalyst is made by contacting the following ingredients (A) to (C). Further, the other embodiment in accordance with the present invention (Second invention) is a catalyst for vapor-phase polymerization of an α-olefin compound under a presence of hydrogen, the catalyst is made by contacting the following ingredients (A) to (C).

(A) a solid catalyst ingredient, comprising:
   (a) a magnesium compound,
   (b) titanium tetrachloride, and
   (c) dialkyl phthalate (Each of the alkyl groups denotes a straight-chain or branched-chain hydrocarbon group having a carbon number of 3 to 20.);
(B) an organoaluminum compound; and
(C) an organosilicon compound, which is expressed by the following general chemical formula (1).

$$(R^1)(R^2CH_2)Si(OR^3)(OR^4) \tag{1}$$

[In the general chemical formula (1), $R^1$ denotes a alicyclic hydrocarbon group having a carbon number of 3 to 12, $R^2$ denotes a branched-chain hydrocarbon group having a carbon number of 3 to 20, and each of $R^3$ and $R^4$ denotes a hydrocarbon group having a carbon number of 1 to 20, respectively.]

As an ingredient (C), by using the specific alicyclicalkyldialkoxysilane as an outside donor, polymerization activity may be improved. As a result, a catalyst for bulk polymerization or vapor-phase polymerization, which provides an olefin polymer having excellent properties in melt flow rate and stereoregularity by adding a small amount of hydrogen, may be provided.

[2] In accordance with the first invention or the second invention, each $R^1$ of the ingredient (C) is preferably a cyclopentyl group or a cyclohexyl group.

As an ingredient (C), by using the specific alicyclicalkyldialkoxysilane as an outside donor, polymerization activity may be more improved. As a result, a catalyst for bulk polymerization or vapor-phase polymerization, which provides an olefin polymer having excellent properties in melt flow rate and stereoregularity by adding a small amount of hydrogen, may be provided.

[3] In accordance with the first invention or the second invention, each of the ingredient (C) is preferably cyclopentylisobutyldimethoxysilane or cyclohexylisobutyldimethoxysilane.

As an ingredient (C), by using the specific alicyclic dialkyldialkoxysilane as an outside donor, polymerization activity may be much more improved. As a result, a catalyst for bulk polymerization or vapor-phase polymerization, which provides an olefin polymer having excellent properties in melt flow rate and stereoregularity by adding a smaller amount of hydrogen, may be provided.

[4] In accordance with the first invention or the second invention, each of the ingredient (C) is preferably an organosilicon compound obtained by the following chemical reaction formula.

[In the chemical reaction formula, each of $R^1$, $R^2$, $R^3$ and $R^4$ denotes the same as $R^1$, $R^2$, $R^3$ and $R^4$ in the chemical general formula (1), respectively.]

Since the ingredient (C) is the organosilicon compound obtained by the above method, the obtained catalyst may become to have high purity and may be made at a low cost. Therefore, polymerization activity may be much more improved. As a result, a catalyst for bulk polymerization or vapor-phase polymerization, which provides an olefin polymer having excellent properties in melt flow rate and stereoregularity by adding a small amount of hydrogen, may be provided.

[5] In accordance with the first invention, catalytic activity is preferably 600 Kg/gTi or higher. In accordance with the second invention, catalytic activity is preferably 700 Kg/gTi or higher.

Since, each of the catalysts for bulk polymerization and vapor-phase polymerization has each of the above catalytic activities, polymerization activity for an α-olefin compound may be improved certainly and polymerization condition may become controlled easily.

[6] In accordance with the first invention or the second invention, it is preferably that the ingredient (A) further comprises a solid catalyst ingredient obtained by contacting silicon tetrachloride as an ingredient (d).

Since the catalyst for bulk polymerization or vapor-phase polymerization includes an inside donor, polymerization activity may be more improved. As a result, a catalyst for bulk polymerization or vapor-phase polymerization, which provides an olefin polymer having excellent properties in melt flow rate and stereoregularity by adding a small amount of hydrogen, may be provided.

[7] In accordance with the first invention or the second invention, the ingredient (A) is preferably a solid catalyst ingredient obtained by a method comprising the following steps of i) to iii) in order.

i) contacting (a) a magnesium compound with (d) silicon tetrachloride,
ii) contacting (c) dialkyl phthalate (Each of the alkyl groups denotes a straight-chain or branched-chain hydrocarbon group having a carbon number of 3 to 20.), and
iii) contacting (b) titanium tetrachloride under a high temperature condition.

Since the solid catalyst ingredient is obtained by contacting (b) titanium tetrachloride and the like in order, (b) titanium tetrachloride may be supported fully and strongly onto the (a) magnesium compound. As a result, polymerization activity may be more improved and thereby a catalyst for bulk polymerization or vapor-phase polymerization, which provides an olefin polymer having excellent properties in melt flow rate and stereoregularity by adding a small amount of hydrogen, may be provided.

[8] In accordance with the first invention or the second invention, the ingredient (A) is preferably a solid catalyst ingredient obtained by the method comprising the following steps of i) to iv) in order.

i) contacting (a) a magnesium compound with (d) silicon tetrachloride,
ii) contacting (c) dialkyl phthalate (Each of the alkyl groups denotes a straight-chain or branched-chain hydrocarbon group having a carbon number of 3 to 20.),
iii) contacting (b) titanium tetrachloride under a high temperature condition, and iv) after washing with a hydrocarbon solvent, adding and contacting (b) titanium tetrachloride under a high temperature condition.

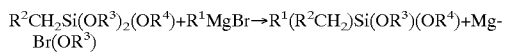

Since the solid catalyst ingredient is obtained by contacting (b) titanium tetrachloride multiple times, (b) titanium tetrachloride may be supported fully and strongly onto the (a) magnesium compound. As a result, polymerization activity may be more improved and thereby a catalyst for bulk polymerization or vapor-phase polymerization, which provides an olefin polymer having excellent properties in melt flow rate and stereoregularity by adding a small amount of hydrogen, may be provided.

[9] The other embodiment in accordance with the present invention (Third invention) is a method for bulk polymerizing an α-olefin compound under a presence of hydrogen by using a catalyst for bulk polymerization, the catalyst is made by contacting the following ingredients (A) to (C), and the other embodiment in accordance with the present invention (Forth invention) is a method for vapor-phase polymerizing an α-olefin compound under a presence of hydrogen by using a catalyst for vapor-phase polymerization, the catalyst is made by contacting the following ingredients (A) to (C).
  (A) a solid catalyst ingredient, comprising:
    (a) a magnesium compound,
    (b) titanium tetrachloride, and
    (c) dialkyl phthalate (Each of the alkyl groups denotes a straight-chain or branched-chain hydrocarbon group having a carbon number of 3 to 20.);
  (B) an organoaluminum compound; and
  (C) an organosilicon compound, which is expressed by the above general chemical formula (1).

[10] In accordance with the third invention or the forth invention, hydrogen partial pressure is preferably within the range of 0.01 to 5 MPa.

Putting the above methods for bulk polymerization and vapor-phase polymerization into practice, the melt flow rate and the stereoregularity of the obtained olefin polymer may be well balanced easily. In addition, since hydrogen partial pressure is within the above range, polymerization activity may become an appropriate value, and pressure resistance design of the receptacle may become easier.

[11] In accordance with the third invention or the forth invention, the α-olefin compound is preferably propylene.

[12] The other embodiment in accordance with the present invention (Fifth invention) is an olefin polymer obtained by bulk polymerization of an α-olefin compound under a presence of hydrogen by using a catalyst for bulk polymerization, the catalyst comprises the following ingredients (A) to (C), and the other embodiment in accordance with the present invention (Sixth invention) is an olefin polymer obtained by vapor-phase polymerization of an α-olefin compound under a presence of hydrogen by using a catalyst for vapor-phase polymerization, the catalyst comprises the following ingredients (A) to (C).
  (A) a solid catalyst ingredient, comprising:
    (a) a magnesium compound,
    (b) titanium tetrachloride, and
    (c) dialkyl phthalate (Each of the alkyl groups denotes a straight-chain or branched-chain hydrocarbon group having a carbon number of 3 to 20.);
  (B) an organoaluminum compound; and
  (C) an organosilicon compound, which is expressed by the above general chemical formula (1).

[13] In accordance with the fifth invention or the sixth invention, the melt flow rate of the olefin polymer, measured under the conditions of 230° C. and 2.16 Kgf/cm² according to JIS-K7210 standard, is preferably within the range of 0.01 to 500 g/10 min.

Since the olefin polymers have the above melt flow rate, the flow ability and the stereoregularity may be well balanced easily.

[14] In accordance with the fifth invention, where the absolute value of the melt flow rate of the olefin polymer is MI, where hydrogen partial pressure during bulk-polymerization is $P_H$ (MPa), and where total pressure during bulk polymerization is $P_T$ (MPa), the following equation (2) is met.

$$MI \geq 1.0 \exp(10.5 \times P_H/P_T) \quad (2)$$

Further, in accordance with the sixth invention, where the absolute value of the melt flow rate of the olefin polymer is MI, where hydrogen partial pressure during vapor-phase polymerization is $P_H$ (MPa), and where total pressure during vapor-phase polymerization is $P_T$ (MPa), the following equation (3) is met.

$$MI \geq 0.045 \exp(155 \times P_H/P_T) \quad (3)$$

Since the above equations (2) and (3) are met, olefin polymers having an excellent melt flow rate may be provided.

[15] In accordance with the fifth invention or the sixth invention, an amount of a heptane-insoluble ingredient of the olefin polymer, measured by Soxhlet extractor under the conditions of using a boiling heptane solvent and 5 hr of extraction, is preferably 90 weight % or higher.

Since an amount of a heptane-insoluble ingredient is within the above range, olefin polymers having an excellent stereoregularity may be obtained.

BEST MODE FOR CARRYING OUT THE INVENTION

Figure 1:
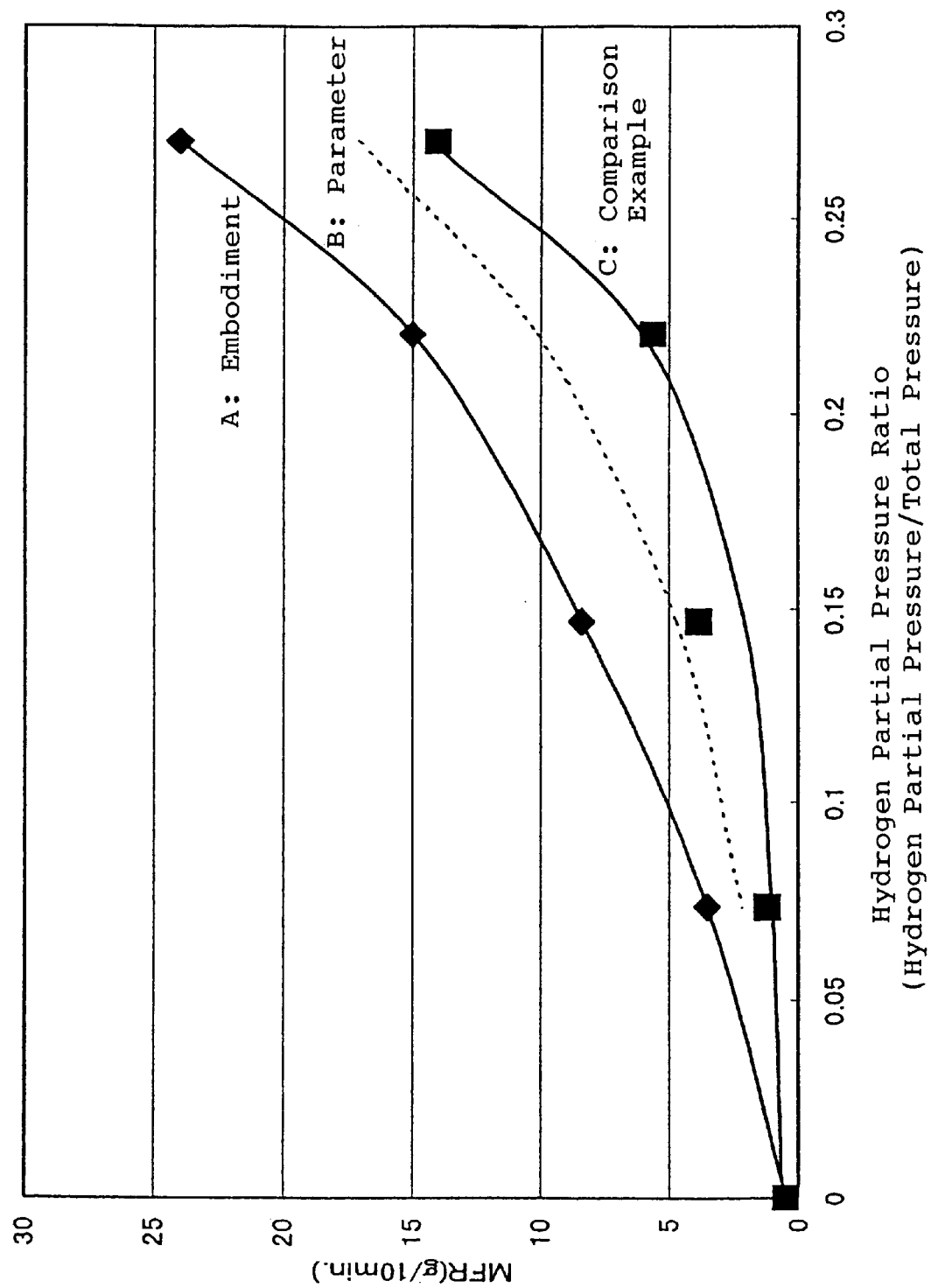
FIG. 1 shows an explanation view showing the relationship between hydrogen partial pressure during bulk polymerization of the olefin polymer in accordance with the fifth embodiment and melt flow rate of the obtained olefin polymer.

A plurality of embodiments (First embodiment to Sixth embodiment) in accordance with the present inventions (First invention to Sixth invention) will be explained as the following.

FIRST EMBODIMENT

First embodiment is an embodiment in accordance with the first invention. The first embodiment relates to a catalyst for bulk polymerization of an α-olefin compound under a presence of hydrogen, the catalyst is made by contacting the following ingredients (A) to (C).
  (A) a solid catalyst ingredient, comprising:
    (a) a magnesium compound,
    (b) titanium tetrachloride,
    (c) dialkyl phthalate (Each of the alkyl groups denotes a straight-chain or branched-chain hydrocarbon group having a carbon number of 3 to 20.), and as the need arises, (d) silicon tetrachloride;
  (B) an organoaluminum compound; and
  (C) an organosilicon compound, which is expressed by the following general chemical formula (1).

$$(R^1)(R^2CH_2)Si(OR^3)(OR^4) \quad (1)$$

[In the general chemical formula (1), $R^1$ denotes a alicyclic hydrocarbon group having a carbon number of 3 to 12, $R^2$ denotes a branched-chain hydrocarbon group having a carbon number of 3 to 20, and each of $R^3$ and $R^4$ denotes a hydrocarbon group having a carbon number of 1 to 20, respectively.]

1. INGREDIENT (A)

The solid catalyst ingredient in accordance with the ingredient (A) is obtained by contacting the following ingredients, the ingredients are a magnesium compound as the ingredient (a); titanium tetrachloride as the ingredient (b); dialkyl phthalate as the ingredient (c); and as the need arises, silicon tetrachloride as the ingredient (d).

(1) INGREDIENT (a)

(i) VARIETY

The variety of ingredient (A) is not restricted, however, the ingredient (A) is preferably the magnesium compound as shown in the general chemical formula (4)

$$MgR^5R^6 \tag{4}$$

[In the general chemical formula (4), each of $R^5$ and $R^6$ is independent each other and is a hydrocarbon group, an $OR^7$ group ($R^7$ is a hydrocarbon group), or a halogen atom respectively.]

In the general chemical formula (4), each of the hydrocarbon groups expressed by $R^5$, $R^6$, and $R^7$ is independent each other and may be an alkyl group having a carbon number of 1 to 12, a cycloalkyl group, an aryl group, an aralkyl group and the like. Also, each of the halogen atoms of $R^5$ and $R^6$ may be chlorine, bromine, iodine or fluorine.

Therefore, as the magnesium compound as shown in the general chemical formula (4), a single compound or a combination of compounds, the compound is selected from the group consisting of:

alkylmagnesium or arylmagnesium, such as dimethylmagnesium, diethylmagnesium, diisopropylmagnesium, dibutylmagnesium, dihexylmagnesium, dioctylmagnesium, ethylbutylmagnesium, diphenylmagnesium, dicyclohexylmagnesium, butyloctylmagnesium and the like;

alkoxymagnesium or aryloxymagnesium, such as dimethoxymagnesium, diethoxymagnesium, dipropoxymagnesium, dibutoxymagnesium, dihexoxymagnesium, dioctoxymagnesium, diphenoxymagnesium, dicyclohexoxymagnesium and the like;

alkylmagnesium halide or arylmagnesium halide, such as ethylmagnesium chloride, butylmagnesium chloride, hexylmagnesium chloride, isopropylmagnesium chloride, isobutylmagnesium chloride, t-butylmagnesium chloride, phenylmagnesium bromide, benzylmagnesium chloride, ethylmagnesium bromide, butylmagnesium bromide, phenylmagnesium chloride, butylmagnesium iodide and the like;

alkoxymagnesium halide or aryloxymagnesium halide, such as butoxymagnesium chloride, cyclohexoxymagnesium chloride, phenoxymagnesium chloride, ethoxymagnesium bromide, butoxymagnesium bromide, ethoxymagnesium iodide and the like; and magnesium halide, such as magnesium chloride, magnesium bromide, magnesium iodide and the like; may be exemplified.

Among the above magnesium compounds, magnesium chloride, dimethoxymagnesium, diethoxymagnesium, dipropoxymagnesium and dibutoxymagnesium are preferable. Because, the grain diameters of the above magnesium compounds may be easily controlled and by using the above magnesium compound, an olefin polymer having an excellent stereoregularity may be obtained.

Further, the above magnesium compounds may include the other element, such as a halogen atom (such as iodine), silicon, aluminum and the like. Further, the above magnesium compounds may preferably include an electron donor, such as alcohol kinds, ether kinds, ester kinds and the like.

Further, the above magnesium compounds may be preferably supported on a support (carrier), such as silica, alumina, polystyrene and the like.

(ii) PREPARATION METHOD

The above mentioned magnesium compounds may be prepared from magnesium metal or a compound including magnesium.

As one example, the magnesium compounds may be prepared by contacting a halogen compound or a alcohol compound to magnesium metal.

As the halogen compound that is contacted, iodine, chlorine, bromine, and fluorine may be used and among them iodine is preferable.

As the alcohol compound that is also contacted, methanol, ethanol, propanol, butanol, octanol and the like may be used.

As the other example, the magnesium compounds may be prepared by contacting a halogenated compound to an alkoxymagnesium compound expressed by $Mg(OR^8)_2$ (In this formula, $R^8$ denotes a hydrocarbon group having a carbon number of 1 to 20.).

As the halogenated compound that is contacted, silicon tetrachloride, silicon tetrabromide, tin tetrachloride, tin tetrabromide, hydrogen chloride and the like may be used and among them silicon tetrachloride is preferable.

(2) INGREDIENT (b)

(i) VARIETY

The ingredient (b) is titanium tetrachloride. The variety of the ingredient is not restricted and purity is not restricted as well.

(ii) USING AMOUNT

The ingredient (b) is preferably used within the range of 0.5 to 100 mol per 1 mol of magnesium atom included in the magnesium compound of the ingredient (a).

Because, since the ingredient (b) is used out of the above range, polymerization activity of the catalyst may be deteriorated and the stereoregularity of the obtained olefin polymer may be deteriorated.

Therefore, the ingredient (b) is preferably used within the range of 1 to 50 mol and is more preferably used within the range of 2 to 30 mol.

(3) INGREDIENT (c)

(i) VARIETY

The ingredient (c) is dialkyl phthalate (Each of the alkyl groups denotes a straight-chain or branched-chain hydrocarbon group having a carbon number of 3 to 20.) and is used as a electron donative compound.

In the alkyl group of dialkyl phthalate, a straight-chain or branched-chain hydrocarbon group having a carbon number of 3 to 20 may be exemplified.

To give actual examples, n-propyl, isopropyl, n-butyl, isobutyl, t-butyl, n-pentyl, 1-methylbutyl, 2-methylbutyl, 3-methylbutyl, 1,1-dimethylpropyl, 1-methylpentyl, 2-methylpentyl, 3-methylpentyl, 4-methylpentyl, 1-ethylbutyl, 2-ethylbutyl, n-hexyl, n-heptyl, n-octyl, n-nonyl, 2-methylhexyl, 3-methylhexyl, 4-methylhexyl, 2-ethylhexyl, 3-ethylhexyl, 4-ethylhexyl, 2-methylpentyl, 3-methylpentyl, 2-etylpentyl, 3-ethylpentyl and the like, are exemplified.

Therefore, as dialkyl phthalate, din-butyl phthalate, diisobutyl phthalate, din-heptyl phthalate, and the lake may be preferably exemplified. The compound may be used as a single compound or a combination of compounds.

(ii) USING AMOUNT

The ingredient (c) is preferably used within the range of 0.01 to 10 mol per 1 mol of magnesium atom included in the magnesium compound of the ingredient (a).

Because, since the ingredient (c) is used out of the above range, polymerization activity of the catalyst may be deteriorated and the stereoregularity of the obtained olefin polymer may be deteriorated.

Therefore, the ingredient (c) is preferably used within the range of 0.05 to 5 mol and is more preferably used within the range of 0.1 to 3 mol.

(4) INGREDIENT (d)

(i) FUNCTION

Silicon tetrachloride ($SiCl_4$) of the ingredient (d) functions as a chlorination auxiliary agent or a precursor of an electron donative compound. Therefore, by adding silicon tetrachloride into the solid catalyst ingredient, polymerization activity of the catalyst may be greatly improved.

(ii) USING AMOUNT FOR

The ingredient (d) is preferably used within the range of 0.01 to 10 mol per 1 mol of magnesium atom included in the magnesium compound of the ingredient (a).

Because, since the ingredient (d) is used out of the above range, polymerization activity of the catalyst may be deteriorated.

Therefore, the ingredient (d) is preferably used within the range of 0.05 to 5 mol and is more preferably used within the range of 0.1 to 3 mol.

(5) CONTACTING METHOD (i) CONTACTING METHOD 1

In order that (b) titanium tetrachloride may be fully and strongly supported onto the (a) magnesium compound, the ingredient (A) is preferably a solid catalyst ingredient obtained by the method comprising the following steps of i) to iii) in order.

i) contacting (a) a magnesium compound with (d) silicon tetrachloride, ii) contacting (c) dialkyl phthalate (Each of the alkyl groups denotes a straight-chain or branched-chain hydrocarbon group having a carbon number of 3 to 20.), and iii) contacting (b) titanium tetrachloride under a high temperature condition.

(i) CONTACTING METHOD 2

In order that (b) titanium tetrachloride may be more fully and strongly supported onto the (a) magnesium compound, the ingredient (A) is preferably a solid catalyst ingredient obtained by the method comprising the following steps of i) to iv) in order.

i) contacting (a) a magnesium compound with (d) silicon tetrachloride, ii) contacting (c) dialkyl phthalate (Each of the alkyl groups denotes a straight-chain or branched-chain hydrocarbon group having a carbon number of 3 to 20.), iii) contacting (b) titanium tetrachloride under a high temperature condition, and iv) after washing step, adding and contacting (b) titanium tetrachloride under a high temperature condition.

In washing step, as a cleaning agent, a hydrocarbon solvent of aliphatic hydrocarbon and/or aromatic hydrocarbon may be preferably used.

(iii) CONTACTING METHOD 3

The temperature of contacting (a) a magnesium compound with (d) a silicon tetrachloride is preferably within the range of −20 to 100° C. in general.

The reason is the following. Since the contacting temperature is lower than −20° C., contacting between (a) a magnesium compound and (d) silicon tetrachloride may become insufficient. On the other hand, since the contacting temperature is higher than 100° C., the temperature is higher than the boiling point of (d) silicon tetrachloride and thereby operation may become more difficult.

Therefore, the temperature of contacting (a) a magnesium compound with (d) a silicon tetrachloride is preferably within the range of 20 to 90° C. and more preferably within the range of 30 to 70° C.

The time of Contacting (a) a magnesium compound with (d) a silicon tetrachloride is preferably within the range of 1 min to 24 hr in general.

The reason is the following. Since the contacting time is shorter than 1 min, contacting between (a) a magnesium compound and (d) silicon tetrachloride may become insufficient. On the other hand, even if the contacting time is longer than 24 hr, contacting reaction may be saturated and manufacturing time becomes longer.

Therefore, the time of contacting (a) a magnesium compound with (d) a silicon tetrachloride is preferably within the range of 5 min to 12 hr and more preferably within the range of 10 min to 6 hr.

(iv) CONTACTING METHOD 4

The temperature of contacting (a) a magnesium compound, (d) a silicon tetrachloride, and (c) dialkyl phthalate (Each of the alkyl groups denotes a straight-chain or branched-chain hydrocarbon group having a carbon number of 3 to 20.) is preferably within the range of 50 to 200° C. in general.

The reason is the following. Since the contacting temperature is lower than 50° C., contacting may become insufficient and thereby polymerization activity may become deteriorated. On the other hand, since the contacting temperature is higher than 200° C., the contacting operation may become difficult, and polymerization activity during polymerization may vary.

Therefore, the contacting temperature is preferably within the range of 70 to 150° C. and more preferably within the range of 80 to 120° C.

The time of contacting (a) a magnesium compound, (d) a silicon tetrachloride, and (c) dialkyl phthalate (Each of the alkyl groups denotes a straight-chain or branched-chain hydrocarbon group having a carbon number of 3 to 20.) is preferably within the range of 1 min to 24 hr in general.

The reason is the following. Since the contacting time is shorter than 1 min, contacting may become insufficient and thereby polymerization activity may become deteriorated. On the other hand, even if the contacting time is longer than 24 hr, contacting reaction may become saturated whereas manufacturing time becomes longer.

Therefore, the time of contacting (a) a magnesium compound, (d) a silicon tetrachloride, and (c) dialkyl phthalate (Each of the alkyl groups denotes a straight-chain or branched-chain hydrocarbon group having a carbon number of 3 to 20.) is preferably within the range of 5 min to 12 hr and more preferably within the range of 10 min to 6 hr.

(v) CONTACTING METHOD 5

The temperature of contacting "a contacting product of (a) a magnesium compound, (d) a silicon tetrachloride, and (c)

dialkyl phthalate (Each of the alkyl groups denotes a straight-chain or branched-chain hydrocarbon group having a carbon number of 3 to 20.)" and "(b) titanium tetrachloride" is preferably within the range of 50 to 200° C. in general.

The reason is the following. Since the contacting temperature of (b) titanium tetrachloride is lower than 50° C., contacting may be insufficient and thereby polymerization activity may be deteriorated. On the other hand, since the contacting temperature is higher than 200° C., the contacting operation may be difficult and polymerization activity during polymerization may vary.

Therefore, the contacting temperature of (b) titanium tetrachloride is preferably within the range of 70 to 150° C. and more preferably within the range of 80 to 120° C.

The time of contacting "a contacting product of (a) a magnesium compound, (d) a silicon tetrachloride, and (c) dialkyl phthalate (Each of the alkyl groups denotes a straight-chain or branched-chain hydrocarbon group having a carbon number of 3 to 20.)"and "(b) titanium tetrachloride" is preferably within the range of 1 min to 24 hr in general.

The reason is the following. Since the contacting time of (b) titanium tetrachloride is shorter than 1 min, contacting may be insufficient and thereby polymerization activity may be deteriorated. On the other hand, even if the contacting time is longer than 24 hr, contacting reaction may become saturated whereas manufacturing time becomes longer.

Therefore, contacting time of (b) titanium tetrachloride is preferably within the range of 5 min to 12 hr and more preferably within the range of 10 min to 6 hr.

(vi) OTHERS

Further, each of the ingredients may be contacted under a presence of an inert solvent such as a hydrocarbon solvent and the like. Also, each of the ingredients may be diluted first with an inert solvent, such as a hydrocarbon solvent and the like, and then each of the ingredients may be contacted.

As the inert solvent, aliphatic hydrocarbon, such as n-pentane, isopentane, n-hexane, n-heptane, n-octane, isooctane and the like; aromatic hydrocarbon, such as benzene, toluene, xylene and the like; and mixture of these compounds may be exemplified.

Further, the solid catalyst ingredient obtained by contacting is preferably washed with the above inert solvent.

Further, the obtained solid catalyst ingredient may be well preserved under the dry condition and may be well preserved in an inert solvent such as a hydrocarbon solvent and the like.

(6) SUPPORT BODY

The solid catalyst ingredient of the ingredient (A) may be preferably supported onto a support body.

To give an actual example, as the support body, an oxide of an element belonging to II to IV family in the periodic table, such as silicon oxide, magnesium oxide and the like, or a multiple oxide having at least the oxide of the element belonging to II to IV family in the periodic table, such as silica-alumina may be preferably used.

In order to prepare the solid catalyst ingredient supported onto the support body, the support body and the above mentioned ingredients (a) to (d) are preferably contacted under the condition of 0 to 200° C. for 2 min to 24 hr.

2. INGREDIENT (B)

(1) VARIETY

Variety of the organoaluminum compound of the ingredient (B) is not restricted. As the organoaluminum compound, an aluminum compound including an alkyl group, a halogen group, a hydrogen atom, an alkoxy group and the like, aluminoxane, and a mixture of these compounds may be preferably used.

To give an actual example, trialkylaluminum, such as trimethylaluminum, triethylaluminum, triisopropylaluminum, triisobutylaluminum, trioctylaluminum and the like; dialkylaluminum monochloride, such as diethylaluminum monochloride, diisopropylaluminum monochloride, diisobutylaluminum monochloride, dioctylaluminum monochloride and the like; alkylaluminum sesquihalide, such as ethylaluminum sesquichloride; chain-aluminoxane, such as methylaluminoxane; and the like; may be exemplified.

Among these organoaluminum compounds, trialkylaluminum having a lower alkyl group having a carbon number of 1 to 5, especially trimethylaluminum, triethylaluminum, tripropylaluminum, and triisobutylaluminum, are preferable.

With regard to the organoaluminum compound, a single compound or a combination of two or more compounds may be used.

(2) USING AMOUNT OF INGREDIENT (B)

The organoaluminum compound of the ingredient (B) is preferably used within the range of 1 to 10,000 mol per 1 mol of titanium atom included in the ingredient (A).

The reason is the following. Since the using amount (Al/Ti) of the ingredient (B) is less than 1 mol, polymerization function of the catalyst may not function (work). On the other hand, the using amount (Al/Ti) of the ingredient (B) is more than 10,000 mol, polymerization function of the catalyst may not function (work) as well.

Therefore, the using amount (Al/Ti) of the ingredient (b) is preferably within the range of 10 to 5,000 mol and is more preferably within the range of 50 to 1,000 mol.

3. INGREDIENT (C)

(1) VARIETY

The ingredient (C) is an organosilicon compound as denoted in the general chemical formula (1). The ingredient (C) functions as an electron donative compound that is added from the outside.

As $R^1$ in the general chemical formula (1), an alicyclic hydrocarbon group having a carbon number of 3 to 12, such as a cyclopropyl group, a cyclobutyl group, a cyclopentyl group, a cyclohexyl group, a cycloheptyl group, a cyclooctyl group, a 1-norbornyl group, a 2-norbornyl group and the like, is exemplified. Among them, a cyclohexyl group and a cyclopentyl group are preferable.

As $R^2$ in the general chemical formula (1), a branched-chain hydrocarbon group having a carbon number of 3 to 20, such as an isopropyl group, a isobutyl group, a sec-butyl group, a t-butyl group, a neopentyl group and the like, is exemplified. Among them, an isopropyl group is especially preferable.

As each of $R^3$ and $R^4$ in the general chemical formula (1), an alkyl group, such as a methyl group, an ethyl group, a propyl group, an isopropyl group, a butyl group, an isobutyl group, a hexyl group, an octyl group and the like; a cyclohexyl group; an alkenyl group, such as an allyl group, a propenyl group, a butenyl group and the like; an aryl group, such as a phenyl group, a tolyl group, a xylyl group and the like; an aralkyl group, such as a phenethyl group, a 3-phenylpropyl group and the like; are exemplified. Among them, an alkyl group having a carbon number of 1 to 10 is especially preferable.

As the organosilicon compound expressed by the general chemical formula (1), a single compound or a combination of compounds, the compound is selected from the group consisting of:

cyclopropylisobutyldimethoxysilane, cyclopropylisopentyldimethoxysilane, cyclopropyl-2- methylbutyldimethoxysilane, cyclopropyl-neopentyldimethoxysilane, cyclopropyl-2-methylhexyldimethoxysilane, cyclobutylisobutyldimethoxysilane, cyclobutyl-isopentyldimethoxysilane, cyclobutyl-2-methylbutyldimethoxysilane, cyclobutyl-neopentyldimethoxysilane, cyclobutyl-2-methylhexyldimethoxysilane, cyclopentylisobutyldimethoxysilane, cyclo-pentylisopentyldimethoxysilane, cyclopentyl-2-methylbutyldimethoxysilane, cyclopentyl-neopentyldimethoxysilane, cyclopentyl-2-methylhexyldimethoxysilane, cyclohexylisobutyldimethoxysilane, cyclohexyl-isopentyldimethoxysilane, cyclohexyl-2-methylbutyldimethoxysilane, cyclohexyl-neopentyldimethoxysilane, cyclohexyl-2-methylhexyldimethoxysilane, cycloheptylisobutyldimethoxysilane, cycloheptyl-isopentyldimethoxysilane, cycloheptyl-2-methylbutyldimethoxysilane, cycloheptyl-neopentyldimethoxysilane, cycloheptyl-2-methylhexyldimethoxysilane, cyclooctylisobutyldimethoxysilane, cyclooctyl-isopentyldimethoxysilane, cyclooctyl-2-methylbutyldimethoxysilane, cyclooctyl-neopentyldimethoxysilane, cyclooctyl-2-methylhexyldimethoxysilane, 1-norbornylisobutyldimethoxysilane, 1-norbornyl-isopentyldimethoxysilane, 1-norbornyl-2-methylbutyl-dimethoxysilane, 1-norbornylneopentyldimethoxy-silane, 1-norbornyl-2-methylhexyldimethoxysilane, 2-norbornylisobutyldimethoxysilane, 2-norbornyl-isopentyldimethoxysilane, 2-norbornyl-2-methylbutyldimethoxysilane, 2-norbornylneopentyl-dimethoxysilane, 2-norbornyl-2-methylhexyl-dimethoxysilane and the like, are exemplified.

In addition, as the organosilicon compound expressed by the general chemical formula (1), a single compound or a combination of compounds, the compound is selected from the group consisting of:

cyclopropylisobutyldiethoxysilane, cyclopropyl-isopentyldiethoxysilane, cyclopropyl-2-methylbutyldiethoxysilane, cyclopropyl-neopentyldiethoxysilane, cyclopropyl-2-methylhexyldiethoxysilane, cyclobutylisobutyldiethoxysilane, cyclobutyl-isopentyldiethoxysilane, cyclobutyl-2-methylbutyldiethoxysilane, cyclobutyl-neopentyldiethoxysilane, cyclobutyl-2-methylhexyldiethoxysilane, cyclopentylisobutyldiethoxysilane, cyclopentyl-isopentyldiethoxysilane, cyclopentyl-2-methylbutyldiethoxysilane, cyclopentyl-neopentyidiethoxysilane, cyclopentyl-2-methylhexyldiethoxysilane, cyclohexylisobutyldiethoxysilane, cyclohexyl-isopentyldiethoxysilane, cyclohexyl-2-methylbutyldiethoxysilane, cyclohexyl-neopentyldiethoxysilane, cyclohexyl-2-methylhexyldiethoxysilane, cycloheptylisobutyldiethoxysilane, cycloheptyl-isopentyldiethoxysilane, cycloheptyl-2-methylbutyldiethoxysilane, cycloheptylneopentyldiethoxysilane, cycloheptyl-2-methylhexyldiethoxysilane, cyclooctylisobutyldiethoxysilane, cyclooctyl-isopentyldiethoxysilane, cyclooctyl-2-methylbutyldiethoxysilane, cyclooctyl-neopentyldiethoxysilane, cyclooctyl-2-methylhexyldiethoxysilane, 1-norbornylisobutyldiethoxysilane, 1-norbornyl-isopentyldiethoxysilane, 1-norbornyl-2-methylbutyldiethoxysilane, 1-norbornyl-neopentyldiethoxysilane, 1-norbornyl-2-methylhexyldiethoxysilane, 2-norbornylisobutyldiethoxysilane, 2-norbornyl-isopentyldiethoxysilane, 2-norbornyl-2-methylbutyldiethoxysilane, 2-norbornyl-neopentyldiethoxysilane, 2-norbornyl-2-methylhexyldiethoxysilane and the like, are also exemplified.

Among these organosilicon compounds, at least one compound selected from the group consisting of cyclopentylisobutyldimethoxysilane, cyclopentylisobutyldiethoxysilane, cyclopentylisobutylmethoxyethoxysilane, cyclohexylisobutyldimethoxysilane, and cyclohexylisobutylmethoxyethoxysilane is preferable.

(2) SYNTHETIC METHOD

The organosilicon compound of the ingredient (c) may be synthesized by any conventional methods. A typical synthetic method comprises the following step.

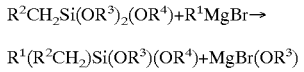

[In the step, each of $R^1$, $R^2$, $R^3$ and $R^4$ denotes the same as $R^1$, $R^2$, $R^3$ and $R^4$ in the chemical general formula (1), respectively.]

In the synthetic step, the raw material, $R^2CH_2Si(OR^3)_2(OR^4)$, may be obtained from a organosilicon compound by known reactions of alkylation and alkoxylation. And the organosilicon compound of the general chemical formula (1) may be obtained from the raw material, $R^2CH_2Si(OR^3)_2(OR^4)$, by applying a known Grignard reagent ($R^1MgBr$).

(3) USING AMOUNT OF INGREDIENT (C)

The organosilicon compound of the ingredient (C) is preferably used within the range of 0.005 to 2 mol per 1 mol of the organoaluminum compound of the ingredient (B).

The reason is the following. Since the using amount of the ingredient (C) is less than 0.005 mol, polymerization activity and stereoregularity may be deteriorated. On the other hand, the using amount of the ingredient (C) is more than 2 mol, polymerization activity may be deteriorated on the contrary.

Therefore, the ingredient (C) is preferably used within the range of 0.007 to 1.5 mol and is more preferably used within the range of 0.01 to 1 mol.

SECOND EMBODIMENT

Second embodiment is an embodiment in accordance with the second invention the second embodiment relates to a catalyst for vapor-phase polymerization of an α-olefin compound under a presence of hydrogen, the catalyst is made by contacting the following ingredients (A) to (C).

(A) a solid catalyst ingredient, comprising:
  (a) a magnesium compound,
  (b) titanium tetrachloride,
  (c) dialkyl phthalate (Each of the alkyl groups denotes a straight-chain or branched-chain hydrocarbon group having a carbon number of 3 to 20.), and as the need arises, (d) a silicon tetrachloride;

(B) an organoaluminum compound; and (C) an organosilicon compound, which is expressed by the following general chemical formula (1).

$$(R^1)(R^2CH_2)Si(OR^3)(OR^4) \qquad (1)$$

[In the general chemical formula (1), $R^1$ denotes a alicyclic hydrocarbon group having a carbon number of 3 to 12, $R^2$ denotes a branched-chain hydrocarbon group having a carbon number of 3 to 20, and each of $R^3$ and $R^4$ denotes a hydrocarbon group having a carbon number of 1 to 20, respectively.]

1. INGREDIENT (A)

The solid catalyst ingredient in accordance with the ingredient (A) of second embodiment is obtained by contacting (a) a magnesium compound, (b) titanium tetrachloride, (c) dialkyl phthalate, and as the need arises (d) a silicon tetrachloride. Since the ingredient (A) is substantially the same as the ingredient (A) of the first embodiment, description of the ingredient (A) will be omitted.

2. INGREDIENT (B)

Since the ingredient (B) of the second embodiment is substantially the same as the ingredient (B) of the first embodiment, description of the ingredient (B) will be omitted.

3. INGREDIENT (C)

Since the ingredient (C) of the second embodiment is substantially the same as the ingredient (C) of the first embodiment, description of the ingredient (C) will be omitted.

THIRD EMBODIMENT

Third embodiment is an embodiment in accordance with the third invention. The third embodiment relates to a method for bulk polymerizing an α-olefin compound under a presence of a bulk polymerization catalyst and hydrogen.

1. USING AMOUNT OF CATALYST FOR BULK POLYMERIZATION

The using amount of the catalyst for bulk polymerization is not restricted. The catalyst for bulk polymerization may be preferably used so that a concentration of Ti atoms included in the solid catalyst ingredient of the ingredient (A) becomes within the range of 0.0001 to 1 mmol per 1 l of reaction volume.

The reason is the following. Since the using amount (Ti concentration) of the catalyst for bulk polymerization is less than 0.0001 mmol, polymerization rate of the α-olefin compound may be lowered and controlling of the molecular weight may be difficult. On the other hand, the using amount (Ti concentration) of the catalyst for bulk polymerization is more than 1 mmol, controlling of the polymerization reaction may be difficult and controlling of the molecular weight may be also difficult.

Therefore, the catalyst for bulk polymerization is preferably used so that a concentration of Ti atoms becomes within the range of 0.001 to 0.5 mmol per 1 l of reaction volume and is more preferably used so that a concentration of Ti atoms becomes within the range of 0.005 to 0.3 mmol per 1 l of reaction volume.

2. α-OLEFIN COMPOUND (1) VARIETY

The variety of the α-olefin compound is not restricted. As the α-olefin compound, the following α-olefin compound expressed by the general chemical formula (5) is preferably used.

$$R^9-CH=CH_2 \qquad (5)$$

[In the general chemical formula (5), $R^9$ denotes a hydrogen atom or a hydrocarbon group.]

Where $R^9$ is a hydrocarbon group, the hydrocarbon group may be saturated or may have a unsaturated portion. Further, where $R^9$ is a hydrocarbon group, the hydrocarbon group may be a straight chain group or may have a branched chain or may be circular.

As the α-olefin compound, a single compound or a combination of compounds, the compound is selected from the group consisting of: ethylene, propylene, 1-butene, 1-pentene, 1-hexen, 1-heptene, 1-octene, 1-decene, 3-methyl-1-pentene, 4-methyl-1-pentene, vinylcyclohexane and the like may be exemplified. Among them, propylene is especially preferable.

3. PRELIMINARY POLYMERIZATION

Before polymerization, preliminary polymerization may be preferably conducted. In that case, the α-olefin compound may be preferably preliminary polymerized under a presence of the above ingredients (A) to (C) and under the conditions of the temperature range of −10 to 100° C. and the pressure range of an ordinary pressure to 5 MPa (gauge).

Further, polymerization time of the preliminary polymerization is preferably within the range of 1 min to 10 hr, and is more preferably within the range of 10 min to 5 hr.

In case of the preliminary polymerization, a polymerization amount of the α-olefin compound is preferably within the range of 0.1 to 1,000 weight % in general, and is more preferably within the range of 1.0 to 500 weight % against the solid catalyst ingredient.

4. POLYMERIZATION (1) POLYMERIZATION TYPE

As a polymerization type of the third embodiment, bulk polymerization is adopted. In bulk polymerization, the α-olefin compound is cooled so that the compound becomes in a liquid state and the liquid α-olefin compound is polymerized.

As bulk polymerization, both of a batch type polymerization and a continuing type polymerization may be used, and further both of a two-step and a multi-step polymerization, each step having different conditions, may be used.

As a polymerization type, homopolymerization of the α-olefin compound such as polypropylene and copolymerization of a plurality of the α-olefin compounds may be used.

In case of copolymerization of the α-olefin compounds, a monomer other than the α-olefin compound, such as butadiene, may be preferably used.

(2) POLYMERIZATION CONDITION

As a bulk polymerization condition of the α-olefin compound, polymerization temperature may be preferably within the range of 0 to 200° C. and more preferable within the range of 30 to 100° C.

A polymerization time of the α-olefin compound depends on the kind of the α-olefin compound and polymerization temperature. The polymerization time may be preferably within the range of 5 min to 20 hr and is more preferably within the range of 10 min to 10 hr.

(3) CHAIN TRANSFER AGENT

With respect to the polymerization of the α-olefin compound, controlling of the molecular weight of the obtained olefin polymer by adding a chain transfer agent, preferably hydrogen, may be preferably used.

In this case, it is preferable that while introducing hydrogen as the chain transfer agent, the α-olefin compound is bulk polymerized, and that the hydrogen partial pressure is within the range of 0.01 to 5 MPa.

The reason is the following. Since the hydrogen partial pressure is lower than 0.01 MPa, controlling of the molecular weight of the α-olefin compound may be difficult. On the other hand, the hydrogen partial pressure is higher than 5 MPa, molecular weight may be too low and thereby treatment of the obtained polymer becomes difficult.

Therefore, the hydrogen partial pressure during bulk polymerization is preferably within the range of 0.1 to 3 MPa and is more preferably within the range of 0.5 to 1 MPa.

(4) AFTER TREATMENT

After treatment of the polymerization is preferably conducted according to the conventional method. For example, in order to deactivate the catalyst used in bulk polymerization completely, a small amount of water or alcohol may be added. According to the after treatment, excessive polymerization may be inhibited and thereby molecular weight may be easily controlled.

Further, in order to remove the raw material monomer (the α-olefin compound) included in the polymer, polymer particles collected after polymerization may be preferably passed through nitrogen gas stream.

Further, as one of the after treatment of the polymerization, the collected polymer particles may be preferably pelletized by an extruder.

FORTH EMBODIMENT

Forth embodiment is an embodiment in accordance with the forth invention. The forth embodiment relates to a method for vapor-phase polymerizing an α-olefin compound under a presence of a vapor-phase polymerization catalyst and hydrogen.

1. USING AMOUNT OF CATALYST FOR VAPOR-PHASE POLYMERIZATION

A using amount of the catalyst for vapor-phase polymerization is not restricted. The catalyst for vapor-phase polymerization may be preferably used so that a concentration of Ti atoms included in the solid catalyst ingredient of the ingredient (A) becomes within the range of 0.0001 to 1 mmol per 1 l of reaction volume.

The reason is the following. Since the using amount (Ti concentration) of the catalyst for vapor-phase polymerization is lower than 0.0001 mmol, polymerization rate of the α-olefin compound may be lowered and controlling of the molecular weight may be difficult. On the other hand, the using amount (Ti concentration) of the catalyst for vapor-phase polymerization is higher than 1 mmol, controlling of the polymerization reaction may be difficult and controlling of the molecular weight may be also difficult.

Therefore, the catalyst for vapor-phase polymerization is preferably used so that a concentration of Ti atoms becomes within the range of 0.001 to 0.5 mmol per 1 l of reaction volume and is more preferably used so that a concentration of Ti atoms becomes within the range of 0.005 to 0.3 mmol per 1 l of reaction volume.

2. α-OLEFIN COMPOUND (1) VARIETY

The α-olefin compound polymerized in the forth embodiment is substantially the same as the α-olefin compound of the third embodiment. As the α-olefin compound, propylene and ethylene may be preferably used.

3. PRELIMINARY POLYMERIZATION

In the forth embodiment, a preliminary polymerization is preferably conducted as same as the third embodiment. For example, the α-olefin compound may be preferably preliminary polymerized under a presence of the above ingredients (A) to (C) and under the conditions of the temperature range of −10 to 100° C. and the pressure range of an ordinary pressure to 5 MPa (gauge).

4. POLYMERIZATION (1) POLYMERIZATION TYPE

As a polymerization type of the forth embodiment, vapor-phase polymerization is adopted. In vapor-phase polymerization, the gaseous α-olefin compound is directly polymerized.

As vapor-phase polymerization, both of a batch type polymerization and a continuing type polymerization may be used, and further a two-step or a multi-step polymerization, each step having different conditions, may be used.

As polymerization type, homopolymerization of the α-olefin compound such as polypropylene or copolymerization of a plurality of the α-olefin compounds may be used.

In case of copolymerization of the α-olefin compounds, a monomer other than the α-olefin compound, such as dienes (such as butadiene etc.) and the like, may be preferably used.

(2) POLYMERIZATION CONDITION

As a polymerization condition of the α-olefin compound, polymerization temperature is preferably within the range of 50 to 200° C. and is more preferably within the range of 60 to 100° C.

A polymerization time of the α-olefin compound depends on the kind of the α-olefin compound and polymerization temperature. The polymerization time is preferably within the range of 5 min to 20 hr and is more preferably within the range of 10 min to 10 hr.

With respect to the polymerization of the α-olefin compound, controlling of the molecular weight of the obtained olefin polymer by adding a chain transfer agent, preferably hydrogen, is preferable.

In this case, it is preferable that while introducing hydrogen as the chain transfer agent, the α-olefin compound is vapor-phase polymerized, and that the hydrogen partial pressure is within the range of 0.001 to 1.2 MPa.

The reason is the following. Since the hydrogen partial pressure is lower than 0.001 MPa, controlling of the molecular weight of the α-olefin compound may be difficult. On the other hand, the hydrogen partial pressure is higher than 1.2 MPa, molecular weight may become too low and thereby treatment of the obtained polymer becomes difficult.

Therefore, the hydrogen partial pressure during vapor-phase polymerization is preferably within the range of 0.005 to 1.0 MPa and is more preferably within the range of 0.01 to 1.0 MPa.

(4) AFTER TREATMENT

After treatment of the polymerization may be used as same as the third embodiment. Deactivation of the catalyst used in the vapor-phase polymerization completely, removing the raw material monomer included in the polymer and pelletizaion of the polymer may be preferable.

FIFTH EMBODIMENT

Fifth embodiment is an embodiment in accordance with the fifth invention. The fifth embodiment relates to a olefin polymer obtained by bulk polymerization of an α-olefin compound, as a raw material monomer, under a presence of a bulk polymerization catalyst and hydrogen.

1. MELT FLOW RATE (MFR)

A melt flow rate (MFR: measured under the conditions of 230° C. and 2.16 Kgf/cm$^2$ (21.2 N/cm$^2$) according to JIS-K7210 standard) of the olefin polymer is preferably within the range of 0.01 to 500 g/10 min.

The reason is the following. Since the melt flow rate of the olefin polymer is lower than 0.01 g/10 min, moldability may be greatly deteriorated. On the other hand, the melt flow rate of the olefin polymer is higher than 500 g/10 min, quality of the olefin polymer may be greatly deteriorated and low molecular weight ingredient may become too much.

Therefore, the melt flow rate of the olefin polymerization is preferably within the range of 0.1 to 300 g/10 min and is more preferably within the range of 1 to 100 g/10 min.

2. MEASUREMENT OF INTRINSIC VISCOSITY [η]

Intrinsic viscosity [η] of the olefin polymer is preferably within the range of 0.2 to 6 dl/g.

The reason is the following. Since intrinsic viscosity [η] of the olefin polymer is lower than 0.2 dl/g, quality of the olefin polymer may be greatly deteriorated and low molecular weight ingredient may become too much. On the other hand, intrinsic viscosity [η] of the olefin polymer is higher than 6 dl/g, moldability may be greatly deteriorated.

Therefore, intrinsic viscosity [η] of the olefin polymer is more preferably within the range of 0.5 to 5 dl/g.

Intrinsic viscosity [η] may be measured in a tetralin solvent under the condition of 135° C. by using an auto-viscosimeter.

3. HEPTANE INSOLUBLE AMOUNT

A heptane insoluble amount of the olefin polymer is preferably 90% or higher.

The reason is the following. Since the heptane insoluble amount of the olefin polymer is lower than 90%, stereo-regularity may be deteriorated and thereby thermal resistance and mechanical property may be deteriorated.

Therefore, the heptane insoluble amount of the olefin polymer is preferably 93% or higher.

The heptane insoluble amount may be measured according to the measurement method described in Example 1.

4. RELATIONSHIP BETWEEN MELT FLOW RATE AND HYDROGEN PARTIAL PRESSURE

With respect to the olefin polymer, where the absolute value of the melt flow rate of the olefin polymer is MI, where partial pressure of hydrogen during the bulk-polymerization is $P_H$ (MPa), and where total pressure during the bulk polymerization is $P_T$ (MPa), the following equation (2) is preferably met.

$$MI \geq 1.0 \exp(10.5 \times P_H/P_T) \qquad (2)$$

Since the equation (2) is met, polymerization activity becomes higher. As a result, by adding a small amount of hydrogen, an olefin polymer having excellent moldability and excellent balance between melt flow rate and stereo-regularity may be provided.

Referring to FIG. 1, it is understood that an olefin polymer that meet the equation (2) has an excellent melt flow rate nevertheless hydrogen partial pressure during bulk polymerization is low.

Therefore, by using the catalyst for bulk polymerization in accordance with the present invention, in order to obtain an olefin polymer having a desired melt flow rate, a smaller amount of hydrogen may be required as compare to using the conventional catalyst for bulk polymerization.

For example, in order to obtain an olefin polymer having a MI value of 10 g/min, using the conventional catalyst for bulk polymerization, hydrogen partial pressure of 0.25 MPa (gauge) is required. Whereas, using the catalyst for bulk polymerization in accordance with the present invention, hydrogen partial pressure of 0.18 MPa (gauge) is needed. As a result, required hydrogen partial pressure can be lowered 30% of the necessity hydrogen pressure.

As a result, stereoregularity of the olefin polymer may be improved and further concentration of the olefin compound may be heightened and thereby polymerization activity may be improved.

SIXTH EMBODIMENT

Sixth embodiment is an embodiment in accordance with the sixth invention. The sixth embodiment relates to a olefin polymer obtained by vapor-phase polymerization of an α-olefin compound, as a raw material monomer, under a presence of a vapor-phase polymerization catalyst and hydrogen.

1. MELT FLOW RATE (MFR)

A melt flow rate (MFR: measured under the conditions of 230° C. and 2.16 Kgf/cm$^2$ (21.2 N/cm$^2$) according to JIS-K7210 standard) of the olefin polymer is preferably within the range of 0.01 to 500 g/10 min.

The reason is the following. Since the melt flow rate of the olefin polymer is lower than 0.01 g/10 min, moldability may be greatly deteriorated. On the other hand, the melt flow rate of the olefin polymer is higher than 500 g/10 min, quality of the olefin polymer may be greatly deteriorated and low molecular weight ingredient may become too much.

Therefore, the melt flow rate of the olefin polymerization is preferably within the range of 0.1 to 300 g/10 min and is more preferably within the range of 1 to 100 g/10 min.

2. MEASUREMENT OF INTRINSIC VISCOSITY [η]

Intrinsic viscosity [η] of the olefin polymer is preferably within the range of 0.2 to 6 dl/g.

The reason is the following. Since intrinsic viscosity [η] of the olefin polymer is lower than 0.2 dl/g, quality of the olefin polymer may be greatly deteriorated and low molecular weight ingredient may become too much. On the other hand, intrinsic viscosity [η] of the olefin polymer is higher than 6 dl/g, moldability may be greatly deteriorated.

Therefore, intrinsic viscosity [η] of the olefin polymer is more preferably within the range of 0.5 to 5 dl/g.

Intrinsic viscosity [η] may be measured in a tetralin solvent under the condition of 135° C. by using an auto-viscosimeter.

3. HEPTANE INSOLUBLE AMOUNT

A heptane insoluble amount of the olefin polymer is preferably 90% or higher.

The reason is the following. Since the heptane insoluble amount of the olefin polymer is lower than 90%, stereo-regularity may be deteriorated and thereby thermal resistance and mechanical property may be deteriorated.

Therefore, the heptane insoluble amount of the olefin polymer is more preferably 93% or higher.

The heptane insoluble amount may be measured according to the measurement method described in Example 1.

4. RELATIONSHIP BETWEEN MELT FLOW RATE AND HYDROGEN PARTIAL PRESSURE

With respect to the olefin polymer, where the absolute value of the melt flow rate of the olefin polymer is MI, where partial pressure of hydrogen during the vapor-phase polymerization is $P_H$ (MPa), and where total pressure during the bulk polymerization is $P_T$ (MPa), the following equation (3) is preferably met.

$$MI \geq 0.045 \exp(155 \times P_H/P_T) \quad (3)$$

Since the equation (3) is met, polymerization activity becomes higher. As a result, by adding a small amount of hydrogen, an olefin polymer having excellent moldability and excellent balance between melt flow rate and stereoregularity, may be provided.

Figure 2:
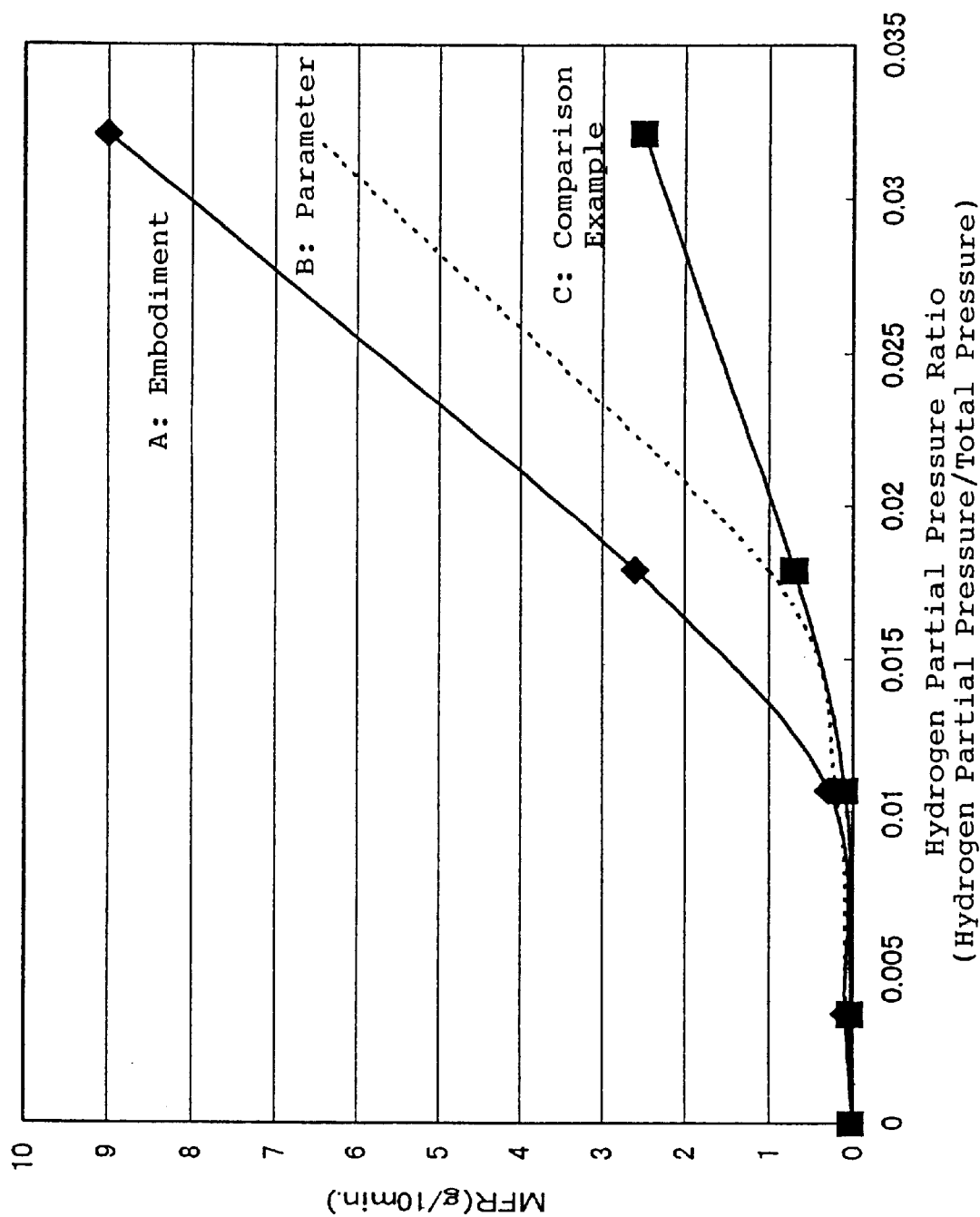
FIG. 2 shows an explanation view showing the relationship between hydrogen partial pressure during vapor-phase polymerization of the olefin polymer in accordance with the sixth embodiment and melt flow rate of the obtained olefin polymer.

Referring to FIG. 2, it is understood that an olefin polymer that meets the equation (3) has an excellent melt flow rate nevertheless hydrogen partial pressure during vapor-phase polymerization is low.

Therefore, by using the catalyst for vapor-phase polymerization in accordance with the present invention, in order to obtain an olefin polymer having a desired melt flow rate, smaller amount of hydrogen may be required as compare to using the conventional catalyst for vapor-phase polymerization.

For example, in order to obtain an olefin polymer having a MI value of 10 g/min by vapor-phase polymerization (total pressure 2.8 MPa), using the conventional catalyst for vapor-phase polymerization, hydrogen partial pressure of 0.18 MPa (gauge) is required. Whereas, using the catalyst for vapor-phase polymerization in accordance with the present invention, hydrogen partial pressure of 0.09 MPa (gauge) is required. As a result, required hydrogen partial pressure can be lowered 50% of the hydrogen pressure.

As a result, stereoregularity of the olefin polymer may be improved and further concentration of the olefin compound may be heightened and thereby polymerization activity may be improved.

EXAMPLES

The present invention will be described in detail according to the following examples. However, of course, the present invention may not be restricted to the following description.

Example 1

(1) PREPARATION OF SOLID CATALYST INGREDIENT (i) STEP FOR CONTACTING INGREDIENT (a) AND INGREDIENT (d)

16 g of diethoxymagnesium, as the ingredient (a), and 80 ml of dehydrated octane were provided in a nitrogen purged three-necked flask of 0.5 l capacity with a stirrer.

Next, temperature in the three-necked flask was heated to 40° C., then 2.4 ml of silicon tetrachloride, as the ingredient (d), was added and the mixture was stirred for 20 minutes.

(ii) STEP FOR CONTACTING INGRDIENT (c)

Next, 3.4 ml of dibutyl phthalate, as the ingredient (c), was added into the three-necked flask.

(iii) STEP 1 FOR CONTACTING INGRDIENT (b)

Next, temperature in the three-necked flask was heated to 80° C., then 77 ml of titanium tetrachloride, as the ingredient (b), was added through a dripping funnel.

(iv) STEP 2 FOR CONTACTING INGRDIENT (b)

Next, temperature in the three-necked flask was heated to 125° C. and contacting was conducted for 2 hours. After that, by stopping stirring, a solid ingredient was precipitated and then the top clear layer was removed.

Next, 100 ml of dehydrated octane was added into the three-necked flask and temperature in the three-necked flask was heated with stirring to 125° C. again. After maintenance the temperature for 1 minute, by stopping stirring, a solid ingredient was precipitated and then the top clear layer was removed again. The above mentioned washing step, including the steps of adding dehydrated octane and removing the top clear layer, was repeated 7 times.

Next, 122 ml of titanium tetrachloride, as the ingredient (b), was added into the three-necked flask, and the temperature in the three-necked flask was heated to 125° C. and contacting was conducted for 2 hours.

Next, a washing step, including the steps of adding 125° C. of dehydrated octane and removing the top clear layer, was repeated 6 times and thereby the solid catalyst ingredient (A) was obtained.

(2) POLYMERIZATION

An stainless steel autoclave of 1 l capacity with a stirrer was vacuum dried and stored in ice, then 400 ml of propylene monomer was introduced by monitoring its liquid level. Then, hydrogen gas was introduced into the autoclave such that the pressure became 1 MPa, then the temperature was heated to 80° C.

Next, from a catalyst throw tube, which was substituted with gaseous nitrogen, 20 ml of heptane, 2 mmol of triethylaluminum, as the ingredient (B), 0.05 mmol of cyclohexylisobutyldimethoxysilane, as the ingredient (c), and the solid catalyst ingredient, as the ingredient (A) (0.001 mmol per Ti atom), were introduced into the autoclave, and propylene monomer was bulk polymerized under the condition of 80° C. for 60 minutes.

After bulk polymerization, pressure in the autoclave was lowered to atmospheric pressure, the autoclave was opened, and the formed polypropylene powder was collected.

Into the obtained polypropylene powder, as a neutralizer, 1,000 ppm of calcium stearate (made by Nippon Oil & Fats Co., Ltd.) and 1,500 ppm of DHT-4A (made by Kyowa Chemical Industry Co., Ltd.) were added, and as an antioxidant, 750 ppm of P-EPQ (made by Clariant K.K.) and 1,500 ppm of IRGANOX 1010 (made by Ciba Specialty Chemicals K.K.) were added, and as a crystal nuclei agent, 2,000 ppm of PTBBA-A1 (made by Dainippon Ink and Chemicals, Inc.) was added.

Next, these additive ingredients were uniformly mixed and a polypropylene powder was melt, mixed and pelletized by using an 20 mm uniaxial mulling extruder, and thereby a polypropylene pellet was formed.

(3) EVALUATION OF POLYPROPYLENE

With respect to the obtained polypropylene pellet, the following physical properties were measured. The obtained results are shown in Table 1.

(i) MEASUREMENT OF MELT FLOW RATE (MFR)

A melt flow rate of the polypropylene pellet was measured under the conditions of 230° C. and 2.16 Kgf/cm² (21.2 N/cm²) according to JIS-K7210 standard.

(ii) MEASUREMENT OF INTRINSIC VISCOSITY [η]

By using a automatic viscosimeter of type VMR-053 (made by Rigousha K.K.), intrinsic viscosity of the obtained polypropylene pellet was measured in a tetralin solvent under the condition of 135° C.

(iii) MEASUREMENT OF HEPTANE INSOLUBLE AMOUNT

By using Soxhlet extractor, extraction treatment of the obtained polypropylene pellet was conducted under the conditions of using a boiling heptane solvent and 5 hr of extraction. The unextracted rest was further dried under the conditions of 80° C. and reduced pressure for 4 hours. Then, the weight of the rest was measured. Based on the weight of the rest and the weight before extraction, heptane insoluble amount of the polypropylene pellet was calculated.

Examples 2 to 4

With respect to Example 2, hydrogen partial pressure during polymerization of propylene was 0.25 MPa (gauge). With respect to Example 3, hydrogen partial pressure during polymerization of propylene was 0.5 MPa (gauge). With respect to Example 4, hydrogen partial pressure during polymerization of propylene was 0.75 MPa (gauge). In each of Examples 2 to 4, propylene was bulk polymerized into polypropylene as same as Example 1 except for the above condition, and the obtained polypropylene was evaluated. The obtained results are shown in Table 1 and parts of the results are shown in FIG. 1.

Comparison Examples 1 to 4

With respect to Comparison Examples 1 to 4, cyclohexylisobutyldimethoxysilane used for polymerization of propylene in Example 1 was changed to dicyclopentyldimethoxysilane. In each of Comparison Examples 1 to 4, propylene was bulk polymerized into polypropylene under a presence of hydrogen as same as Examples 1 to 4 except for the above condition, and the obtained polypropylene was evaluated. The obtained results are shown in Table 2 and parts of the results are shown in FIG. 1.

Comparison Examples 5 and 6

With respect to Comparison Examples 5 and 6, hydrogen partial pressure was 0 MPa (gauge). In each of Comparison Examples 5 and 6, propylene was bulk polymerized into polypropylene as same as Comparison Example 1 and Example 1 except for the above condition, and the obtained polypropylene was evaluated. The obtained results are shown in Table 2 and parts of the results are shown in FIG. 1.

TABLE 1

| Polymerization Type | | Example 1 Bulk | Example 2 Bulk | Example 3 Bulk | Example 4 Bulk |
|---|---|---|---|---|---|
| Catalyst | Ingredient A (mmol) | 0.001 | 0.001 | 0.001 | 0.001 |
| | a: | $Mg(OEt)_2$ | $Mg(OEt)_2$ | $Mg(OEt)_2$ | $Mg(OEt)_2$ |
| | b: | $TiCl_4$ | $TiCl_4$ | $TiCl_4$ | $TiCl_4$ |
| | c: | DNBP | DNBP | DNBP | DNBP |
| | d: | $SiCl_4$ | $SiCl_4$ | $SiCl_4$ | $SiCl_4$ |
| | Ingredient B | TEA | TEA | TEA | TEA |
| | (mmol) | 2.0 | 2.0 | 2.0 | 2.0 |
| | Ingredient C | CyiBuSi | CyiBuSi | CyiBuSi | CyiBuSi |
| | (mmol) | 0.05 | 0.05 | 0.05 | 0.05 |
| Polymerization Condition | Polymerization Time(min) | 60 | 60 | 60 | 60 |
| | Polymerization Temperature (° C.) | 80 | 80 | 80 | 80 |
| | Hydrogen Partial Pressure (MPa) | 1.0 | 0.25 | 0.5 | 0.75 |
| | Total Pressure (Mpa) | 3.7 | 3.4 | 3.4 | 3.4 |
| Evaluation | Polymerization Activity (kg/g-Ti) | 980 | 1360 | 1250 | 1100 |
| | Intrinsic Viscosity (dl/g) | 1.28 | 2.10 | 1.60 | 1.50 |
| | MFR (g/10 min) | 24 | 3.5 | 8.4 | 15 |
| | Heptane Insoluble Amount (wt %) | 98.9 | 99.0 | 99.1 | 98.9 |

*DNBP: di-n-butyl phthalate
*CyiBuSi: cyclohexylisobutydimethoxysilane
*DCPDMS: dicyclopentyldimethoxysilane
*TEA: triethylaluminum
*The using amount of the ingredient A is an actual Ti amount.

TABLE 2

| Polymerization Type | | Comparison Example 1 Bulk | Comparison Example 2 Bulk | Comparison Example 3 Bulk | Comparison Example 4 Bulk | Comparison Example 5 Bulk | Comparison Example 6 Bulk |
|---|---|---|---|---|---|---|---|
| Catalyst | Ingredient A (mmol) | 0.001 | 0.001 | 0.001 | 0.001 | 0.001 | 0.001 |
| | a: | $Mg(OEt)_2$ | $Mg(OEt)_2$ | $Mg(OEt)_2$ | $Mg(OEt)_2$ | $Mg(OEt)_2$ | $Mg(OEt)_2$ |
| | b: | $TiCl_4$ | $TiCl_4$ | $TiCl_4$ | $TiCl_4$ | TIC14 | $TiCl_4$ |
| | c: | DNBP | DNBP | DNBP | DNBP | DNBP | DNBP |
| | d: | $SiCl_4$ | $SiCl_4$ | $SiCl_4$ | $SiCl_4$ | $SiCl_4$ | $SiCl_4$ |
| | Ingredient B (mmol) | TEA 2.0 | TEA 2.0 | TEA 2.0 | TEA 2.0 | TEA 2.0 | TEA 2.0 |

TABLE 2-continued

|  |  | Comparison Example 1 Bulk | Comparison Example 2 Bulk | Comparison Example 3 Bulk | Comparison Example 4 Bulk | Comparison Example 5 Bulk | Comparison Example 6 Bulk |
|---|---|---|---|---|---|---|---|
| Polymerization Type |  |  |  |  |  |  |  |
|  | Ingredient C | DCPDMS | DCPDMS | DCPDMS | DCPDMS | DCPDMS | CyiBuSi |
|  | (mmol) | 0.05 | 0.05 | 0.05 | 0.05 | 0.05 | 0.05 |
| Polymerization Condition | Polymerization Time(min) | 60 | 60 | 60 | 60 | 60 | 60 |
|  | Polymerization Temperature (° C.) | 80 | 80 | 80 | 80 |  |  |
|  | Hydrogen Partial Pressure (Mpa) | 0.25 | 0.5 | 0.75 | 0 | 0 |  |
|  | Total Pressure (Mpa) | 3.7 | 3.4 | 3.4 | 3.4 | 3.4 | 3.4 |
| Evaluation | Polymerization Activity (kg/g-Ti) | 960 | 1360 | 1280 | 1150 | 880 | 890 |
|  | Intrinsic Viscosity (dl/g) | 1.4 | 2.6 | 1.95 | 1.89 | 3.1 | 3.2 |
|  | MFR (g/10 min) | 14 | 1.2 | 3.8 | 5.6 | 0.5 | 0.5 |
|  | Heptane Insoluble Amount (wt %) | 98.9 | 99.1 | 99.0 | 99.0 | 99.1 | 99.1 |

Example 5

(1) PREPARATION OF SOLID CATALYST INGREDIENT

A solid catalyst ingredient was prepared as same as Example 1.

(2) METHOD FOR POLYMERIZATION

An stainless steel autoclave of 7 l capacity with a stirrer was nitrogen purged and maintained its temperature at 70° C.

Next, propylene gas was introduced into the autoclave such that the pressure became 0.05 MPa (gauge pressure) and hydrogen gas was also introduced into the autoclave such that the pressure became 0.03 MPa (gauge pressure). Further, propylene gas was introduced gradually into the autoclave such that the total pressure became 2.8 MPa (gauge pressure).

Next, from a catalyst throw tube, which was substituted with gaseous nitrogen, 20 ml of heptane, 2 mmol of triethylaluminum, as the ingredient (B), 0.5 mmol of cyclohexylisobutyldimethoxysilane, as the ingredient (C), and the solid catalyst ingredient prepared by the above (1), as the ingredient (A) (0.005 mmol per Ti atom), were introduced into the autoclave, and propylene monomer was vapor-phase polymerized under the condition of 70° C. for 60 minutes.

After vapor-phase polymerization, pressure in the autoclave was lowered to atmospheric pressure, the autoclave was opened, and the formed polypropylene powder was collected.

Into the obtained polypropylene powder, as a neutralizer, 1,000 ppm of calcium stearate (made by Nippon Oil & Fats Co., Ltd.) and 1,500 ppm of DHT-4A (made by Kyowa Chemical Industry Co., Ltd.) were added, and as an antioxidant, 750 ppm of P-EPQ (made by Clariant K.K.) and 1,500 ppm of IRGANOX 1010 (made by Ciba Specialty Chemicals K.K.) were added, and as a crystal nuclei agent, 2,000 ppm of PTBBA-Al (made by Dainippon Ink and Chemicals, Inc.) was added.

Next, these additive ingredients were uniformly mixed and a polypropylene powder was melt, mixed and pelletized by using an 20 mm uniaxial mulling extruder, and thereby a polypropylene pellet was formed.

(3) EVALUATION OF POLYPROPYLENE

With respect to the obtained polypropylene pellet, a melt flow rate (MFR), intrinsic viscosity [η], and heptane insoluble amount of the polypropylene pellet were measured as same as Example 1. The obtained results were shown in Table 3.

Examples 6 to 8

With respect to Examples 6, hydrogen partial pressure was 0.01 MPa (gauge). With respect to Examples 7, hydrogen partial pressure was 0.05 MPa (gauge). With respect to Examples 8, hydrogen partial pressure was 0.9 MPa (gauge). In each of Examples 6 to 8, propylene was vapor-phase polymerized into polypropylene as same as Example 1 except for the above condition, and the obtained polypropylene was evaluated. The obtained results are shown in Table 3 and parts of the results are shown in FIG. 2.

Comparison Examples7 to 10

With respect to Comparison Examples 7 to 10, cyclohexylisobutyldimethoxysilane used for polymerization of propylene in Examples 5 to 8 was changed to dicyclopentyldimethoxysilane. In each of Examples 7 to 10, propylene was vapor-phase polymerized into polypropylene under a presence of hydrogen, as same as Examples 5 to 8, except for the above condition, and the obtained polypropylene was evaluated. The obtained results are shown in Table 4 and parts of the results are shown in FIG. 2.

Comparison Examples 11 and 12

With respect to Comparison Examples 11 and 12, hydrogen partial pressure was 0 MPa (gauge). In each of Comparison Examples 11 and 12, propylene was vapor-phase polymerized into polypropylene as same as Comparison Example 7 and Example 5, except for the above condition, and the obtained polypropylene was evaluated. The obtained results are shown in Table 4 and parts of the results are shown in FIG. 2.

Comparison Examples 13

With respect to Examples 13, 2,800 ml of n-heptane was used as a solvent. In Comparison Examples 13, propylene was slurry polymerized into polypropylene by using same catalyst as Example 5 except for the above condition, and the obtained polypropylene was evaluated. The obtained results are shown in Table 4.

INDUSTRIAL APPLICABILITY

As fully described above, the present invention provides a catalyst for bulk or vapor-phase polymerization having

TABLE 3

| | | Example 1 Vapor-Phase | Example 2 Vapor-Phase | Example 3 Vapor-Phase | Example 4 Vapor-Phase |
|---|---|---|---|---|---|
| Polymerization Type | | | | | |
| Catalyst | Ingredient A (mmol) | 0.005 | 0.005 | 0.005 | 0.005 |
| | a: | Mg(OEt)$_2$ | Mg(OEt)$_2$ | Mg(OEt)$_2$ | Mg(OEt)$_2$ |
| | b: | TiCl$_4$ | TiCl$_4$ | TiCl$_4$ | TiCl$_4$ |
| | c: | DNBP | DNBP | DNBP | DNBP |
| | d: | SiCl$_4$ | SiCl$_4$ | SiCl$_4$ | SiCl$_4$ |
| | Ingredient B (mmol) | TEA 2.0 | TEA 2.0 | TEA 2.0 | TEA 2.0 |
| | Ingredient C (mmol) | CyiBuSi 0.05 | CyiBuSi 0.05 | CyiBuSi 0.05 | CyiBuSi 0.05 |
| Polymerization Condition | Polymerization Time (min) | 60 | 60 | 60 | 60 |
| | Polymerization Temperature (° C.) | 70 | 70 | 70 | 70 |
| | Hydrogen Partial Pressure (MPa) | 0.03 | 0.01 | 0.05 | 0.09 |
| | Total Pressure (Mpa) | 2.8 | 2.8 | 2.8 | 2.8 |
| Evaluation | Polymerization Activity (kg/g-Ti) | 1340 | 1260 | 2020 | 2170 |
| | Intrinsic Viscosity (dl/g) | 3.3 | 4.0 | 2.1 | 1.7 |
| | MFR (g/10 min) | 0.3 | 0.1 | 2.6 | 9.0 |
| | Heptane Insoluble Amount (wt %) | 99.1 | 99.0 | 99.0 | 99.0 |

TABLE 4

| | Comparison Example 7 | Comparison Example 8 | Comparison Example 9 | Comparison Example 10 | Comparison Example 11 | Comparison Example 12 | Comparison Example 13 |
|---|---|---|---|---|---|---|---|
| Polymerization Type | Vapor-Phase | Vapor-Phase | Vapor-Phase | Vapor-Phase | Vapor-Phase | Vapor-Phase | Slurry |
| Catalyst | | | | | | | |
| Ingredient A (mmol) | 0.005 | 0.005 | 0.005 | 0.005 | 0.005 | 0.005 | 0.005 |
| a: | Mg(OEt)$_2$ | Mg(OEt)$_2$ | Mg(OEt)$_2$ | Mg(OEt)$_2$ | Mg(OEt)$_2$ | Mg(OEt)$_2$ | Mg(OEt)$_2$ |
| b: | TiCl$_4$ | TiCl$_4$ | TiCl$_4$ | TiCl$_4$ | TiCl$_4$ | TiCl$_4$ | TiCl$_4$ |
| c: | DNBP | DNBP | DNBP | DNBP | DNBP | DNBP | DNBP |
| d: | SiCl$_4$ | SiCl$_4$ | SiCl$_4$ | SiCl$_4$ | SiCl$_4$ | SiCl$_4$ | SiCl$_4$ |
| Ingredient B (mmol) | TEA 2.0 | TEA 2.0 | TEA 2.0 | TEA 2.0 | TEA 2.0 | TEA 2.0 | TEA 2.0 |
| Ingredient C (mmol) | DCPDMS 0.05 | DCPDMS 0.05 | DCPDMS 0.05 | DCPDMS 0.05 | DCPDMS 0.05 | CyiBuSi 0.05 | CyiBuSi 0.05 |
| Polymerization Condition | | | | | | | |
| Polymerization Time (min) | 60 | 60 | 60 | 60 | 60 | 60 | 60 |
| Polymerization Temperature (° C.) | 70 | 70 | 70 | 70 | 70 | 70 | 70 |
| Hydrogen Partial Pressure (Mpa) | 0.03 | 0.01 | 0.05 | 0.09 | 0 | 0 | 0.03 |
| Total Pressure (Mpa) | 2.8 | 2.8 | 2.8 | 2.8 | 2.8 | 2.8 | 2.8 |
| Evaluation | | | | | | | |
| Polymerization Activity (kg/g-Ti) | 1310 | 1050 | 1950 | 2120 | 960 | 790 | 980 |
| Intrinsic Viscosity (dl/g) | 4.0 | 5.2 | 2.8 | 2.3 | 5.5 | 4.2 | 5.5 |
| MFR (g/10 min) | 0.1 | 0.03 | 0.7 | 2.5 | 0.02 | 0.08 | 0.02 |
| Heptane Insoluble Amount (wt %) | 99.1 | 99.0 | 99.0 | 99.0 | 99.0 | 99.1 | 99.0 | high polymerization activity during bulk or vapor-phase polymerization and providing an olefin polymer having excellent properties in melt flow rate and stereoregularity by adding a small amount of hydrogen. The present invention also provides methods for polymerizing an α-olefin compound using the above catalysts. Further, the present invention also provides an α-olefin compounds having excellent properties in stereoregularity and melt flow rate by using the above catalysts.

What is claimed is:

1. A catalyst for bulk or vapor-phase polymerization of an α-olefin compound in the presence of hydrogen, wherein the catalyst is made by contacting the following ingredients (A) to (C):
   (A) a solid catalyst ingredient, comprising:
      (a) a magnesium compound,
      (b) titanium tetrachloride, and
      (c) dialkyl phthalate wherein each of the alkyl groups denotes a straight-chain or branched-chain hydrocarbon group having a carbon number of 3 to 20;
   (B) an organoaluminum compound; and
   (C) an organosilicon compound, which is expressed by the following general chemical formula (1):

$$(R^1)(R^2CH_2)Si(OR^3)(OR^4) \qquad (1)$$

wherein $R^1$ denotes an alicyclic hydrocarbon group having a carbon number of 3 to 12, $R^2$ denotes a branched-chain hydrocarbon group having a carbon number of 3 to 20, and each of $R^3$ and $R^4$ denotes a hydrocarbon group having a carbon number of 1 to 20, respectively.

2. The catalyst for bulk or vapor-phase polymerization as recited in claim 1, wherein $R^1$ of the ingredient (C) is a cyclopentyl group or a cyclohexyl group.

3. The catalyst for bulk or vapor-phase polymerization as recited in claim 1, wherein the ingredient (C) is cyclopentylisobutyldimethoxysilane or cyclohexylisobutyldimethoxysilane.

4. The catalyst for bulk or vapor-phase polymerization as recited in claim 1, wherein the ingredient (C) is an organosilicon compound obtained by the following chemical reaction formula:

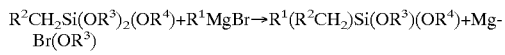

wherein each of $R^1$, $R^2$, $R^3$ and $R^4$ denotes the same as $R^1$, $R^2$, $R^3$ and $R^4$ in the chemical general formula (1), respectively.

5. The catalyst for bulk or vapor-phase polymerization as recited in claim 1, wherein catalytic activity of bulk phase polymerization is 600 Kg/gTi or higher.

6. The catalyst for bulk or vapor-phase polymerization as recited in claim 1, wherein the ingredient (A) further comprises a solid catalyst ingredient obtained by contacting silicon tetrachloride as an ingredient (d).

7. The catalyst for bulk or vapor-phase polymerization as recited in claim 6, wherein the ingredient (A) is a solid catalyst ingredient obtained by a method comprising the following steps of i) to iii) in order:
   i) contacting (a) a magnesium compound with (d) silicon tetrachloride,
   ii) contacting (c) dialkyl phthalate where each of the alkyl groups denotes a straight-chain or branched-chain group having a carbon number of 3 to 20, and
   iii) contacting (b) titanium tetrachloride under a high temperature condition.

8. The catalyst for bulk or vapor-phase polymerization as recited in claim 6, wherein the ingredient (A) is a solid catalyst ingredient obtained by the method comprising the following steps of i) to iv) in order:
   i) contacting (a) a magnesium compound with (d) silicon tetrachloride,
   ii) contacting (c) dialkyl phthalate where each of the alkyl groups denotes a straight-chain or branched-chain group having a carbon number of 3 to 20,
   iii) contacting (b) titanium tetrachloride under a high temperature condition, and
   iv) after washing with a hydrocarbon solvent, adding and contacting (b) titanium tetrachloride under a high temperature condition.

9. The catalyst for bulk or vapor-phase polymerization as recited in claim 1, wherein catalytic activity of vapor-phase polymerization is 700 Kg/gTi or higher.

10. The catalyst for bulk or vapor-phase polymerization as recited in claim 1, wherein the dialkyl phthalate is selected from the group consisting of di-n-butyl phthalate, diisobutylphthalate, and di-n-heptyl phthalate and the orgonosilicon compound is selected from the group consisting of cyclopentylisobutyldimethoxysilane, cyclopentylisobutyldiethoxysilane, cyclohexylisobutyldimethhoxysilane, and cyclohexylisobutylmethoxyethoxysilane.

11. The catalyst for bulk or vapor-phase polymerization as recited in claim 1, wherein the dialkyl phthalate is di-n-butyl phthalate and the organosilicon compound is cyclohexylisobutyldimethoxysilane.

12. A method for bulk or vapor-phase polymerizing an α-olefin compound in the presence of hydrogen by using a catalyst for bulk or vapor-phase polymerization, wherein the catalyst is made by contacting the following ingredients (A) to (C):
   (A) a solid catalyst ingredient, comprising:
      (a) a magnesium compound,
      (b) titanium tetrachloride, and
      (c) dialkyl phthalate wherein each of the alkyl groups denotes a straight-chain or branched-chain group having a carbon number of 3 to 20;
   (B) an organoaluminum compound; and
   (C) an organosilicon compound, which is expressed by the following general chemical formula (1)

$$(R^1)(R^2CH_2)Si(OR^3)(OR^4) \qquad (1)$$

where $R^1$ denotes an alicyclic hydrocarbon group having a carbon number of 3 to 12, $R^2$ denotes a branched-chain hydrocarbon group having a carbon number of 3 to 20, and each of $R^3$ and $R^4$ denotes a hydrocarbon group having a carbon number of 1 to 20, respectively.

13. The method for bulk or vapor-phase polymerizing as recited in claim 12, wherein hydrogen partial pressure is within the range of 0.01 to 5 MPa.

14. The method for bulk or vapor-phase polymerizing as recited in claim 12, wherein the α-olefin compound is propylene.

15. The method for bulk or vapor-phase polymerization as recited in claim 12, wherein the dialkylphthalate is selected from the group consisting of di-n-butyl phthalate, diisobutylphthalate, and di-n-heptyl phthalate and the orgonosilicon compound is selected from the group consisting of cycloperitylisobutyldimethoxysilane, cyclopentylisobutyldiethoxysilane, cyclohexylisobutyldimethoxysilane, and cyclohexylisobutylmethoxyethoxysilane.

16. The method for bulk or vapor-phase polymerization as recited in claim 12, wherein the dialkyl phthalate is di-n-butyl phthalate and the organosilicon compound is cycloisobutyldimethoxysilane.

* * * * *